Jan. 6, 1970  W. G. LAIRD ET AL  3,488,439
TELEVISING SYSTEM
Filed July 18, 1966  3 Sheets-Sheet 3
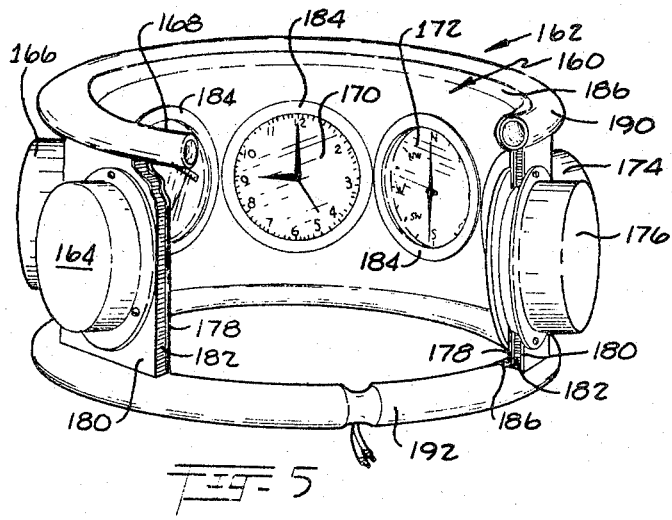
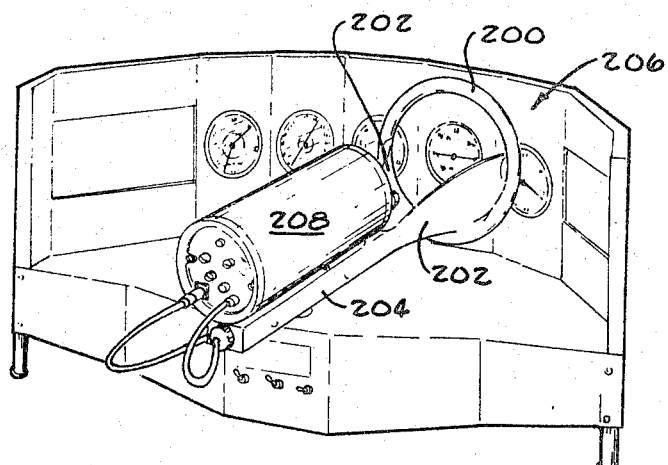
INVENTORS
WILLIAM G. LAIRD
LYLE O. KEYS
DONALD L. McCLELLAN
JOHN A. BRIGGS
VICTOR F. C. PECK
*Lynn G. Foster*
ATTORNEY

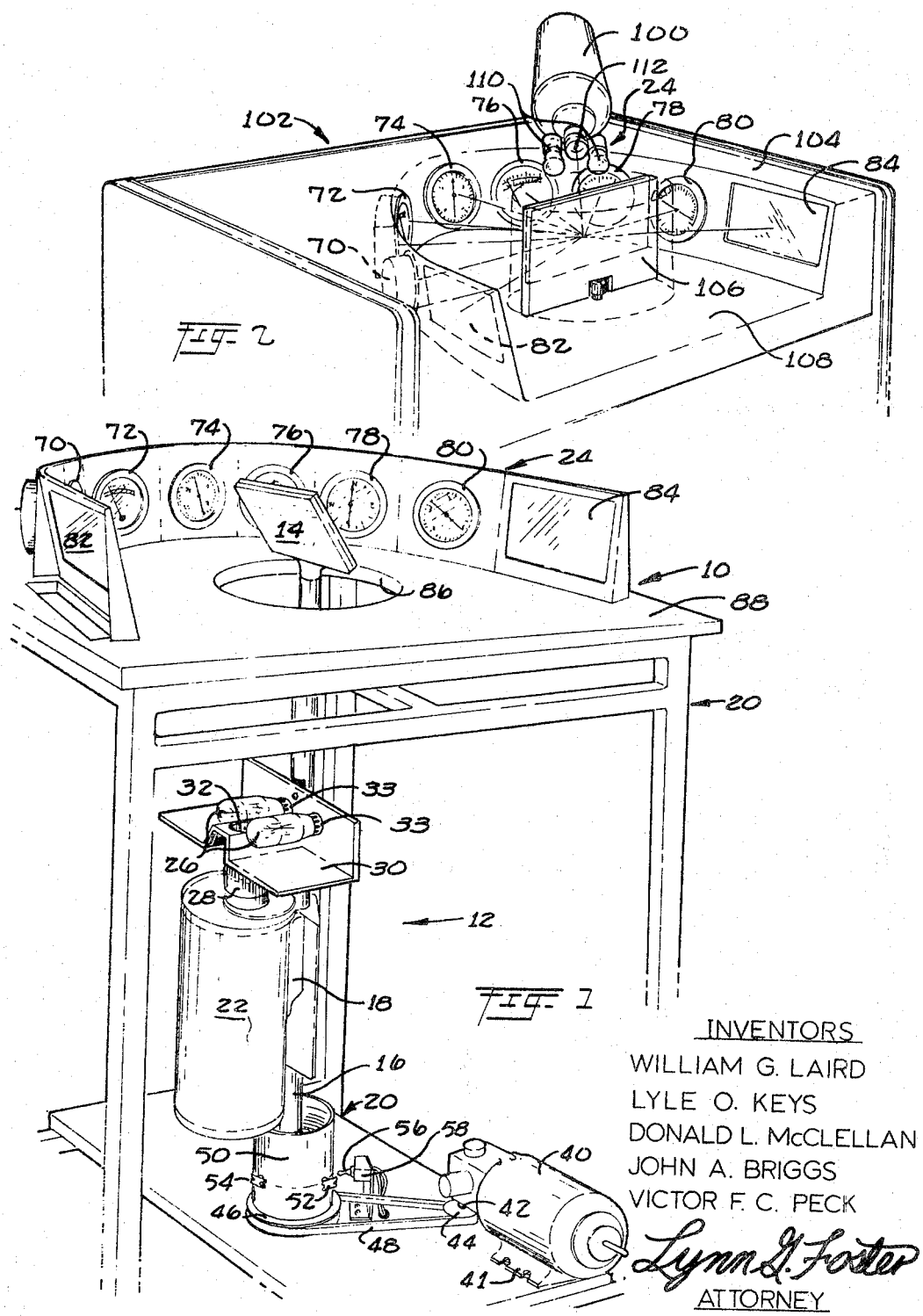

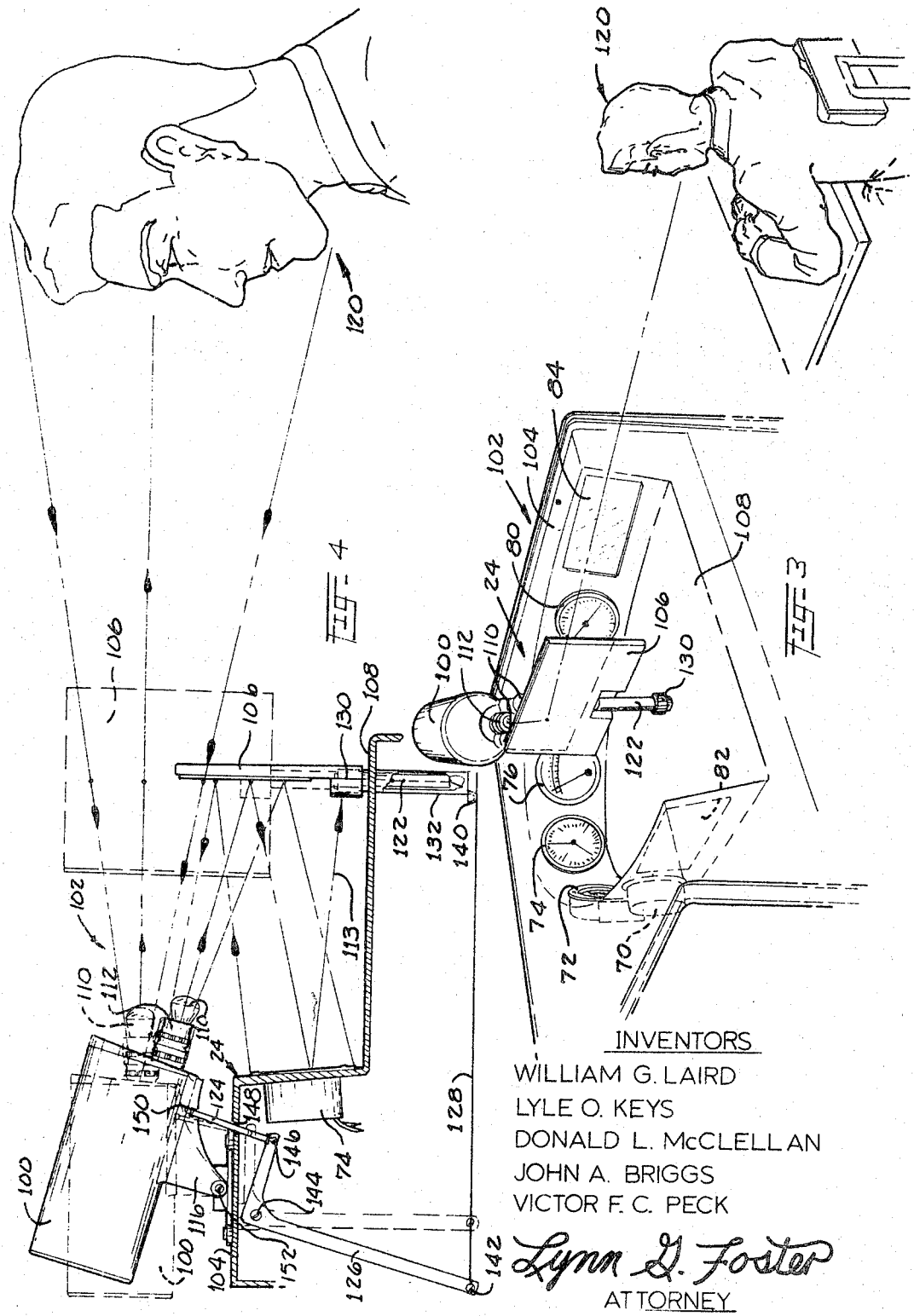

United States Patent Office 3,488,439
Patented Jan. 6, 1970

3,488,439
TELEVISING SYSTEM
William G. Laird, Lyle O. Keys, Donald L. McClellan, John A. Briggs, and Victor F. C. Peck, Salt Lake City, Utah, assignors to Telemation, Inc.
Filed July 18, 1966, Ser. No. 566,075
Int. Cl. H01j 29/02, 29/86; H04n 7/00
U.S. Cl. 178—7.8                                          7 Claims

ABSTRACT OF THE DISCLOSURE

A televising system including light and optics structure which significantly improves the quality of images televised and facilitates reduction in the physical dimension of the televising apparatus comprising a first surface mirror, disposed at the radial center of an arcuate array of meteorological instruments and card display stations, which first reflects light immediately next to the camera lens to illuminate the portion of the array being televised. The light image of the portion of the array so illuminated is reflected back toward the camera to be focused upon the light-sensitive element of the camera pick up tube for televising. The camera and mirror are adapted to be adjusted relative to one another into a position accommodating televising of a "live" subject area remote from the intrument array. Novel illuminating apparatus is provided.

---

This invention relates generally to a novel system, including method and apparatus, for televising, and more particularly to improved televising systems comprising unique lighting and optics which have particular utility for selectively televising a series of indicating dials and other information including "live" subjects.

Many systems have heretofore been proposed for successively and automatically televising a series of display stations, such as instruments for relaying weather conditions, making weather forecasts and the like, especially over closed circuit and community antenna television systems. Use of a rectilinear or a circular bank of meteorological and other instruments along with a moving camera, are the principal commercial adaptations of such prior proposals. See U.S. Patents 3,226,476, and 3,239,-601 and the references listed therein for examples. Usually instrument dials having a reflective or light-color background are used to create better picture definition because of limitations possessed by present-day television pick-up, distribution and receiving equipment. In actual practice, such techniques while generally satisfactory, have not consistently produced pictures of such a quality as may be easily discerned and comprehended by television viewers, principally due to distracting shadows cast by prior lighting and optics systems upon the instrument dial background by the pivoting dial pointers and also due to objectionable reflections from the glass covering the instruments. Also, avoiding serial image inversions by providing a uniform image orientation emanating from several subject areas using a television camera and a mirror has been a formidable commercial obstacle in the mentioned art. For example, see U.S. Patent 1,660,-886. Moreover, selective televising of "live" subjects in conjunction with such instruments using a single televising camera has been so cumbersome that it has been used only sparingly.

Accordingly, it is a primary object of this invention to provide novel apparatus for and unique methods of televising.

Another important object of this invention is to provide an improved televising system for illuminating information-containing instruments so as to eliminate or conceal from view any undesirable meter-pointer shadows and light image reflections.

Another significant object of this invention is the provision of improved television optics and a compactly arranged, self-contained televising system, advantageously reducing the over-all physical size of the embodiment to make it more functional, practical, and attractive.

Another principal object is the provision of a novel apparatus and a unique method for selectively televising either an array of essentially inanimate subject areas, such as weather intsruments, meterological data, etc., or "live" subject areas such as one or more announcers of news, weather, sports, etc.

Another significant object of this invention is the provision of a novel system by which the field of view of a television camera may continuously scan a series of fixed stations or, alternatively, be directed away from the array of stations toward one or more remote subject areas, such for "live" studio telecasting.

Another important object of this invention is to provide a system of substantially shielding a television camera lens from direct sources of external light, such as sunlight and room illumination.

Another significant object of this invention is the provision of a television system comprising several subject areas, a mirror and a camera which maintains uniform image orientation at the camera thereby obviating serial image inversions.

These and other objects and features of the present invention will become more fully apparent from the following description and appended claims taken in conjunction with the accompanying drawings wherein:

FIGURE 1 is a fragmentary perspective of one presently preferred embodiment of this invention depicting a simplified drive mechanism, a television camera mount, an arcuate array and, more particularly, a novel optics and illumination system for televising the array;

FIGURE 2 is fragmentary perspective of a second presently preferred embodiment of this invention illustrating unique lighting and optics for televising an arcuate array of instruments;

FIGURE 3 is a fragmentary perspective view of the embodiment of FIGURE 2 showing the relative positions of the camera, mirror and subject for "live" telecasting;

FIGURE 4 is a side elevation of the embodiment of FIGURES 2 and 3 illustrating the relative positions of the camera and the mirror, and the associated cable and linkage, (a) for televising the inanimate subject areas of the arcuate array (shown in solid lines) and (b) for "live" telecasting (illustrated in dotted lines);

FIGURE 5 is a perspective view of a system for illuminating an arcuate array of indicating instrument faces to be serially televised; and FIGURE 6 is a perspective representation of another presently preferred embodiment for successively televising arcuately arranged indicating instruments so as to avoid undesirable shadows and reflections.

Keeping in mind that the present invention relates primarily to new and unique apparatus for and methods of subject area illumination and optics and to "live" telecasting features, specific reference is now made to the drawings wherein like numerals are used to designate like parts throughout. FIGURES 1 and 2 show two different embodiments of the present invention having some common features including novel lighting and optics for successively televising a series of meteorological instruments and card display stations disposed in an arcuate array. Generically, a first surface mirror, disposed at the radial center of the arcuate array, is used for reflecting light originating immediately next to the camera lens to illuminate the portion of the array being televised. Thus, the light images of the instruments and stations of the array are serially reflected back toward the camera to be focused on the light-sensitive element of the camera pick-up tube for televising.

Specifically, the television apparatus of FIGURE 1, generally designated 10, comprises a unitary drive shaft assembly, generally designated 12, which drive shaft assembly includes a mirror 14, a drive shaft 16, and a camera mount 18. The drive shaft 16 is rotatably supported by a frame 20 in an essentially vertical position, such as by bearing pillow blocks or the like (not shown). The camera mount 18 is suitably secured, such as by clamps, welding or the like, to a shaft 16 so that the camera rotates to and fro with the shaft 16 and the mirror 14. The camera 22 is integrally fastened upon the camera mount 18 so that the camera reversibly unitarily rotates with the shaft 16 to sweep the view of the camera across the instrument array, generally designated 24. Thus, in this way the instrument subject areas are successively televised by use of the mirror 14.

To improve the quality of imgaes televised through alleviation of desirable shadows and reflections, incandescent lamps 26 preferably of a type having integral reflectors, are mounted slightly ahead of and only slightly to one side of the optical path of the camera lens 28 so that the source of the subject area illumination will be only negligibly off-set from the mentioned optical axis.

A heat shield 30, spaced just below the lamps 26 is also rigidly attached to the oscillating drive assembly 12 and serves the multiple purpose of protecting the camera 22 and the lens 28 from radiated heat produced by the lamps 26, re-radiating heat absorbed from the lamps, and providing a means for suitably mounting the lamp receptacles 33. An aperture 32 in the shield 30 accommodates viewing by the camera lens of the subject area image reflected by the mirror 14.

A reversible gearmotor 40 is mounted at 41 upon the main frame 20 to rotationally displace the drive assembly 12 around a point coincident with the centerline axis of the shaft 16. The output drive shaft 42 of the motor 40 is rotationally coupled to the shaft 16 by V pulleys 44 and 46 and V belt 48.

The V pulley 46 has a vertically oriented drum extension 50 which provides means by which the rotational direction of the gearmotor 40 is periodically reversed responsive to the movement of the assembly 12. Specifically, outward extending protrusions 52 and 54, stationarily positioned along the circumference of the drum 50, will alternately come in contact with and actuate the switch lever 56 of the switch 58 as the drum rotates. Actuation of the lever 56 causes the field winding connection of the gearmotor 40 to be electrically reversed, which reverses the rotational direction of travel traversed by the assembly 12.

Thus, with the view of the camera trained upon mirror 14, the assembly 12 will be rotated, preferably at a uniform velocity, about the centerline of the shaft 16 first counter-clockwise essentially through the number of angular degrees corresponding to the space occupied by the array 24 and, thereafter, counter-clockwise essentially through the same number of degrees. The mirror 14, being disposed essentially at the arc-center of the array 24, will cause the view of the camera to successively televise the card display station 82, the indicating face of the instruments 70, 72, 74, 76, 78, and 80 and the card display station 84. If desired, either or both stations 82 and 84 may comprise a slide projector screen containing a suitable image imposed by a slide projector as disclosed in U.S. Patent No. 3,239,601.

In order to successively scan the light images emanating from the instrument and card display subject areas, which are reflected as reverse images by the mirror 14 to the camera, the camera must reverse the resultant picture electronically by scanning the photosensitive area of the vidicon pick-up opposite to normal. This is achieved by reversing the attachments of the two wires of the horizontal deflection coil of the camera.

To explain in detail the operation of the apparatus 10, shown in FIGURE 1, light emitted by lamps 26 is directed onto the surface of the mirror 14, through the aperture 86 in the top of platform 88 of the frame 20, by reason of integral reflector elements mounted within the glass bulb of each of the lamps 26 directly behind the filament. Upon striking the highly reflective first surface of the mirror 14, the light is thereafter directed toward the particular subject area of the array 24 being viewed. Thus, the display cards 82 and 84 and the reflective indicating faces of the instruments 70–80 are each televised in order according to the instantaneous rotational position of the shaft 16. The resultant light image is in turn reflected back from the subject area of the array striking the first surface of the mirror 14 and subsequently being focused upon the photosensitive area of the vidicon pick-up tube of the camera by the camera lens 28. Experience has demonstrated that use of such a camera in conjunction with instruments which are mounted in the panel array 24 such that the transparent cover glass of each instrument is tilted slightly from the vertical, either forward or back, and therefore is not perpendicular to the optical axis so that the lamp image reflections pass out of view of the camera thereby producing televised images of excellent quality. For a compact unit of a type disclosed having relatively small dimensions an angle of, for example, on the order of approximately 94° with respect to the plane occupied by the table top 88 works very well to direct glass reflections out of the view of the camera. This "tilting" of the instruments relative to the optical axis is of no serious consequence with regard to image distortion because the slight resultant change in apparent picture height viewed by the camera is not perceptible.

Although the lamps 26, located near the camera lens 28, cast a very dark and distinct pointer shadow upon the indicating dials of the instruments of the array 24, these otherwise objectionable shadows are caused to fall directly behind the pointer when viewed through the lens 28 of the camera 22. Thus, the exact position of the needle or pointer relative to the dial is clearly discernable to the television viewer, making reading thereof comparatively easy. To achieve this essentially non-visible shadow effect and generally contrary to the teachings of the mentioned prior art, the source or sources of light disposed at the camera lens 28 must be placed as close as practical to the optical axis of the lens 28. It should also be appreciated that, if desired, the drive assembly 12, can be disabled in a position reflecting the view of the camera off the surface of the mirror 14 away from the array 24 for "live" telecasting, as will more fully be appreciated as this description proceeds.

FIGURE 2 depicts a second presently preferred embodiment of this invention, which is very similar in many respects to the embodiment already described in conjunction with FIGURE 1. Thus, substantially identical parts are designated by identical numbers without further description. In each embodiment no serial image inversion occurs and the camera lens is effectively shielded by the mirror from undesired external light.

The main difference between the embodiments of FIGURES 1 and 2 is the location of the camera. Specifically, the camera 100 of the apparatus generally designated 102 of the FIGURE 2 is mounted in an essentially stationary position upon the overall frame 104 when the card display stations 82 and 84 and the instrument 70–80 are being televised. Thus, during televising of the array 24 of FIGURE 2, only the mirror 106, which is located essentially at the arc-center of the array, is rotated about the axis of its support 122 to sweep the view of the camera across the array. The embodiment of FIGURE 2 has the camera 100 mounted above the table top 108 of the frame 104 providing the advantages of easy access, compact construction and improved ventilation for the associated light sources 110 disposed a negligible distance from the optical axis at the lens 112. Also, electrical cable (not shown) providing power to and taking signals from the camera are not subjected to continuous flexing due to camera motion.

Preferably as in the optical system of FIGURE 1, the mounted instruments 70–80 and display stations 82 and 84 of FIGURE 2 are slightly angularly disposed with respect to the optical axis so that light from the sources 110 obliquely strike the glass of each instrument successively whereby the mirror images of the lamps 110 do not thereafter again strike the reflective surface of the mirror 106 and are passed outside the field of view of the camera and the images televised will be relatively high quality. For example, undesired light rays will strike the opaque skirt at the bottom of the mirror 106 and will not thereafter indirectly reach the reflective surface of the mirror. It is important from a practical viewpoint that the reflective surface of the mirror 106 and the surfaces of the indicating dials instruments 70–80 and the card display stations 82 and 84 be nearly parallel and that the center of the useful area of the mirror 106 to be at a proper height so as to generally divide the total angle of the folded optical axis of lens 112 approximately equally between a plane disposed perpendicular to the optical center of the reflective surface of the mirror 106, as is shown in FIGURE 4. This prevents optical twisting of the subject area relative to the camera 100 as the mirror 106 is rotated for scanning the array.

FIGURES 3 and 4 depict a novel way of televising a "live" subject using the apparatus 102, previously described in conjunction with FIGURE 2. The camera 100, used for automatically televising the fixed array 124 as explained above, along with the mirror 106 are jointly used to televise the "live" subject area 120. The camera and mirror positions used to televise the array 24 are shown in solid lines in FIGURE 4 while the camera and mirror positions used to televise the live subject 120 are shown in dotted lines in FIGURE 4. Because the camera 100 is equipped with a lens of relatively long focal length for the application intended and the camera and lens are preferably pointed somewhat downward during normal viewing the array when the apparatus is floor-supported, it is usually desirable to tilt the camera from its normal operating position shown in solid lines to the "live" telecasting position shown in dotted lines in FIGURE 4. Thus, sufficient elevation of the field of view is maintained at the increased distance required for televising of "live" subject 120. At the same time, the axial position of the mirror 106 is elevated from the solid to the dotted position in FIGURE 4 so that the image of the "live" subject 120 is televised as reflected from the mirror 106. Likewise, the angular position of the mirror 106 may be radially altered for selection of a plurality of remote subject areas. However, the changing of the tilt position of the camera and the axial position of the mirror 106 will not be necessitated where the entire apparatus 102 is mounted in an elevated position, such as when the apparatus is suspended from the ceiling.

Structurally, the camera 100 (FIGURE 4) is integrally secured by suitable means, such as mounting bolts, to a tilting mounting bracket 116 and connected by satisfactory linkage to the telescoping mirror shaft 122. This linkage comprises a rod 124, a bellcrank 126 and a cable 128. A knurled locking nut 130 in conjunction with an inside split tapered ring (not shown) serves to rigidly lock the inside telescoping shaft 122 and the outside shaft 132 both radially and axially into a unitary structure. An indexing pin and notch (not shown) may, if desired, be provided, in a conventional way, to permit the relative angular position of the shafts 122 and 132 to be readily returned to the position shown in solid lines in FIGURE 4 for properly scanning the array 24. Thus, loosening and tightening the locking nut 130 will accommodate axial and radial movement of the shaft 122 for repositioning of the mirror 106 to suit the operator's purposes.

To explain in detail the operation of the apparatus 102 for "live" telecasting as shown in FIGURES 3 and 4, the mirror assembly 100 is raised manually. This is achieved by loosening knurled nut 130 and by axially extending the combined length of the shafts 122 and 132 from the solid to the dotted location of FIGURE 4. The reflective surface of the mirror 106 is also angularly repositioned to cause the camera to view the image of the "live" subject 120. The rotating drive means which rotates the mirror 106 during scanning of the array 24 and which is preferably the type as described in conjunction with FIGURE 1, may be disabled so that the mirror 106 will be essentially stationary. As the mirror 106 is manually moved upward, the flexible cable 128 is pulled around the radius of a cap bushing 140 (FIGURE 4). Cap bushing 140 is suitably connected to the lower end of the outside shaft 122 which in turn is rotatably secured by suitable conventional means to the frame 104, for driving to sweep the array 124. As the cable 128 is pulled taut, the opposite end of the cable, being attached to the downwardly extending leg of the bellcrank 126 at aperture 142, causes the bellcrack 126 to rotate counter-clockwise around the pivot axis of pin 144, where the bellcrack joins the frame 104. This exerts an upward force on the rod 124, which passes through an aperture 148 in the frame 104 and is pivotally joined to the distal end of the horizontal leg of the bellcrack 126 and 146 and to the camera mount 116 at 150. This lifts the forward end of the camera mount 116 counter-clockwise around pivot pin 152 to tilt the camera from the solid to the dotted position shown in FIGURE 4. In this way, light images of the "live" subject 120 are reflected off the front surface of the mirror 106 and into the camera lens 112 to be focused upon the photosensitive area of the vidicon tube of the camera for televising. Incandescent lamps 110 will be adequate for live telecasting only if the "live" subject area is relatively small and positioned close to the mirror 106. Otherwise, additional illumination will have to be used to supplement the light emanating from the lamps 110 as will be the case where relatively large objects are to be televised.

The knurled nut 130 may be left in a somewhat loose state for continuously panning and tilting of the field of view of the camera to simulate freedom of camera movement in two planes for shifting to televise various "live" subjects covering a relatively large area. The nut 130 may also be locked in any position to select a fixed angular position for the mirror 106 around the center of the shaft 122. This also will fix the height of the mirror above the table 108 for pre-selected "live" subject area telecasting.

Reference is now made to FIGURES 5 and 6 which depict two techniques for using an arcuate light source to provide uniform instrument dial lighting without pointer shadows and objectionable light reflections. Such circular light sources, exhibiting an omni-directional light radiation pattern, are particularly useful to illuminate an arcuate array of instruments, especially where the instruments are circular in shape.

In the FIGURE 5, the arcuate panel 160 of the apparatus 162 comprises suitable instruments and/or display stations as previously mentioned. Specifically, the panel 160 is illustrated as comprising meteorological and other instruments 164, 166, 168, 170, 172, 174, and 176. The mounting panel 160 also comprises vertical spaced panel walls 178 and 180 each of cylindrical configuration. The wall 178 is opaque and is spaced from the wall 180 by a small gap 182 therebetween. If desired, short spacers (not shown) can be provided between the two walls 178 and 182 to maintain the gap 182 at the desired distance. It is preferred that the gap 182 between the panels 178 and 180 be filled with a suitable plastic or like material, such as acrylic plastic, which will easily transmit light. Also, the interior side of the panels 178 and 180 are preferably highly polished to reflect light.

The instruments are mounted, as illustrated, in suitable apertures in the walls 178 and 180 with an annular bezel 184 mounted in front of each instrument as is conventional. The inside panel section 178, in addition to being arcuately shaped, also has a contoured lip 186 at both the top and bottom.

The lighting assembly of the apparatus 162 comprises two annular fluorescent lamp fixtures 190 and 192 which are secured to and shielded by the top and bottom lips 186. Thus, light originating at fixtures 190 and 192 will pass along the gap 182 between the panel sections 178 and 180 and through apertures (not shown) in the circumferential casing of the instruments 164–176.

Light rays emitted by light fixtures 190 and 192 when transmitted through acrylic plastic or like material disposed in space 182 are for the most part retained and evenly distributed therein by the qualities of the acrylic plastic material. Thus, the inside edge of the apertures associated with the instruments receives the light which shadowlessly illuminates the face of each dial as it is diffused along radial light path at each instrument dial. A substantial portion of the diffused light is directed behind the pointers of each instrument. Hence, shadows are not cast by the pointers which would be annoying to the viewer nor are undesirable reflections created at the glass window of each instrument. Any suitable camera mount or optic mount can be placed at the center of the arcuate array 160 for serially televising the instruments. For example, the camera drive and mount system of FIGURE 1 could be adapted for use in conjunction with the apparatus 162 of FIGURE 5.

In FIGURE 6, another system for illumination of an instrument or instruments to be televised is depicted. An annular light source comprising a fluorescent fixture 200 is rigidly associated with extension arms 202 of an oscillating camera mount 204 positioned approximately at the center of a generally arcuate instrument array 206. The fixture 200 used with this system sweeps close to the instruments of the array 206 and is dimensioned so as to illuminate without districting shadows and reflections the instrument of the array to be televised and yet be disposed outside the view of the camera 208.

The camera mount 204 is caused to oscillate by suitable drive means such as that disclosed in U.S. Patent 3,239,601. Thus, the camera 208 will sweep the array 206 from a point coincident with the arc-center of the array, the camera being oriented so that the lens thereof is focused upon a field of view inside the area encircled by the fixture 200. Thus, with the fixture 200 in close proximity to the array of instruments 206, light will radiate directly from the fixture 200 generally radially upon the indicating dials of the array instruments at an angle such that pointer shadows will be eliminated and the protective glass face of the instruments will not reflect a mirror image within the field of view of the camera.

Thus, the several embodiments of the present invention provide novel televising lighting and optics which significantly improve the quality of images televised and facilitate reduction in the physical dimensions of the televising apparatus. Also, alternate televising of inanimate and "live" subject areas using a single camera is uniquely achieved by the present invention. Significantly, the former image inversion problem encountered by using a mirror and spaced subject areas has been resolved.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meanings and range of equivalency of the claims are therefore to be embraced therein.

What is claimed and desired to be secured by United States Letters Patent is:

1. In a televising apparatus, an accurate array of subject areas, a rotatable reflective surface disposed at the arc-center of the array mounted for rotation about an axis, a television camera with the optical axis generally transverse to the reflective surface and trained upon the said reflective surface, light source means disposed immediately peripherally adjacent the optical axis at the camera lens concentrated upon the reflective surface to illuminate the subject area being televised and to cause the light-image of said subject area to be reflected from the reflective surface to the camera along the optical axis, means for rotating the reflective surface about the axis for rotation to sweep the view of the camera across the arcuate array thereby serially televising the subject areas.

2. A device as defined in claim 1 wherein said camera is positioned so that the longitudinal axis of the camera generally parallels and is coextensive at least in part with the axis of rotation of the reflective surface.

3. A device as defined in claim 2 wherein the camera rotates with the reflective surface.

4. A device as defined in claim 1 wherein said camera is positioned adjacent the array and the optical axis is generally transverse of the axis for rotation of the reflective surface.

5. A device as defined in claim 1 further comprising means for selectively shifting the view of the camera from the array to a live subject area.

6. In a televising apparatus, an arcuate array of subject areas, a rotatable reflective surface disposed at the arc-center of the array, a television camera with the optical axis trained upon the reflective surface, light source means disposed immediately adjacent the optical axis at the camera lens for illuminating the subject area being televised, means for rotating the reflective surface to sweep the view of the camera across the arcuate array thereby serially televising the subject areas, means for selectively shifting the view of the camera from the array to a live subject area, said shifting means comprises means for changing (a) the axial position and (b) the rotational position of the reflective surface and means for tilting the camera to train the view thereof toward the changed position of the reflective surface.

7. A method of selectively televising an arcuate array of essentially inanimate subject areas and at least one live subject area, the steps of: directing the view of the camera toward a reflective surface disposed at the arc-center of the array and selectively changing the position of the reflective surface to optionally direct the view of the camera from said reflective surface to televise the arcuate array of the subject areas seriatim and the at least one live subject area by axially extending and rotating the reflective surface and tilting the camera to direct the view of the camera upon the reoriented position of the camera.

References Cited

UNITED STATES PATENTS

| | | | |
|---|---|---|---|
| 1,660,886 | 2/1928 | Randall | 178—6.8 |
| 2,682,603 | 6/1954 | Dine et al. | 240—1.3 |
| 2,188,821 | 1/1940 | Rylsky | 240—2.1 |
| 2,905,758 | 9/1959 | Walker | 178—7.2 |
| 3,177,646 | 4/1965 | Ernest | 350—114 |
| 3,226,476 | 12/1965 | Tyler. | |
| 3,239,601 | 3/1966 | Keys | 178—6 |

ROBERT L. GRIFFIN, Primary Examiner

BARRY L. LEIBOWITZ, Assistant Examiner

U.S. Cl. X.R.

178—68, 6